(No Model.)
F. F. SEVEY.
BREAD CUTTING PLATE.
No. 471,198. Patented Mar. 22, 1892.
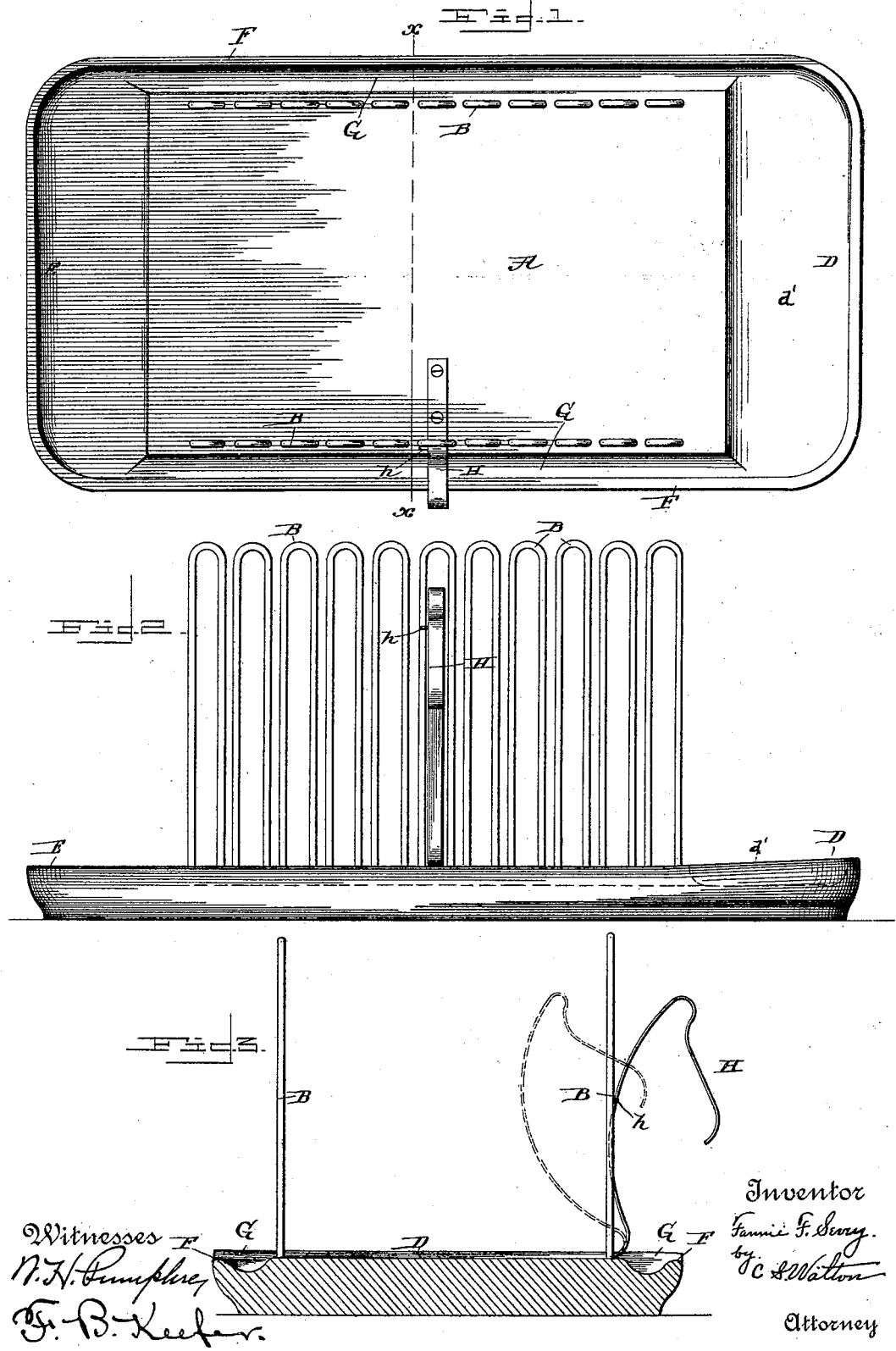

UNITED STATES PATENT OFFICE.

FANNY F. SEVEY, OF BOSTON, MASSACHUSETTS.

BREAD-CUTTING PLATE.

SPECIFICATION forming part of Letters Patent No. 471,198, dated March 22, 1892.

Application filed October 31, 1891. Serial No. 410,497. (No model.)

*To all whom it may concern:*

Be it known that I, FANNY F. SEVEY, a citizen of the United States of America, residing at Boston, in the county of Suffolk and State of Massachusetts, have invented certain new and useful Improvements in Bread-Cutting Plates, of which the following is a specification, reference being had therein to the accompanying drawings.

My invention relates to a bread-cutting plate, and has for its object to produce a simple and inexpensive apparatus for holding a loaf of bread or cake, guiding a knife so as to cut the loaf readily into slices of uniform thickness, and to prevent crumbs from falling off said plate.

The apparatus consists, essentially, of a plate-shaped base and loaf-holding and knife-guiding uprights arranged in a row upon each side of said plate with sufficient space between the rows to permit loaves of different sizes to be quickly inserted, held in position, and cut into uniform slices.

Figure 1 represents a plan view of the bread-cutting plate. Fig. 2 is a side elevation of said plate; and Fig. 3 is a cross-section taken on line $x\,x$, Fig. 1, and illustrates also a spring loaf-holding device.

In the drawings, A is the plate or base, upon which the loaf is placed and held stationary while being cut. This plate may be constructed of wood, metal, or other substance.

B represents the loaf-holding and knife-guiding uprights arranged in rows—one upon each side of the plate—to guide the knife in cutting the loaf into slices. These uprights B may be formed of wire bent in a U-shaped form, as shown, with the rounded portions C uppermost, or may be cast in that form of any suitable material. The ends are fixed in the base in any well-known manner. The distance between the corresponding upright portions or arms of any two adjoining guiding-uprights is equal to the width of the slice to be cut.

D represents the forward rim or edge portion of the plate slightly elevated and provided with a receptacle $d'$, as shown, to prevent crumbs, as well as the slices of bread, from falling off the plate when the slices fall forward after being cut, caused by pushing the loaf forward into a new position for cutting. It is evident that if a sufficient number of knife-guiding uprights be used the entire loaf may be cut up and the slices pushed forward by the next loaf that is inserted. The rear portion E is preferably left without a rim and is even with the middle portion of the plate to allow the loaf to be readily inserted and slid along.

F are rims or side edges of the plate for the prevention of crumbs from dropping off the plate. Rims F are slightly lower than the middle portion of the plate.

G represents troughs or receptacles on the sides of the plate between the base of the knife-guiding uprights and the side rims F to hold crumbs and also serve as rests for the cutting knife or knives when not in use.

H represents a spring loaf-holding device of curved contour, as shown in Fig. 3, which may be attached in any suitable manner to one side of the base of the plate immediately in front of the central knife-guiding upright, so that by means of its handle the spring may be drawn backward out of its normal position between the arms of the upright and fastened in that position by a small projection $h$ on its side engaging with the adjacent arm of the upright, as shown. This spring device may be used when smaller loaves are to be cut or when it is desired to hold any loaf firmly in position. It is evident that I may use differently-shaped plates and any number of knife-guiding uprights without departing from the spirit of my invention.

What I claim as new, and desire to secure by Letters Patent, is—

1. The combination of a bread-cutting plate A of curved contour with elevated end portion D provided with a receptacle $d'$, and knife-guiding uprights arranged in rows upon the sides of the plate, substantially as described and set forth.

2. A bread-cutting plate with elevated end portion D and receptacle $d'$, in combination with knife-guiding uprights, and troughs or receptacles G on the sides of the plate, substantially as described and set forth.

3. The combination of the bread-cutting plate A, knife-guiding uprights B, elevated end portion D, receptacle $d'$, side rims F, and receptacles G, as and for the purpose set forth.

4. A bread-cutting plate of curved contour with elevated end portion D and receptacle $d'$, in combination with knife-guiding uprights B, arranged in two rows, substantially as described and set forth.

5. The combination of a bread-cutting plate with elevated end portion D and receptacle $d'$, knife-guiding uprights arranged in rows upon each side of the plate, and a spring loaf-holding device H, as and for the purposes set forth.

In testimony whereof I affix my signature in presence of two witnesses.

FANNY F. SEVEY.

Witnesses:
GEORGE B. UPHAM,
FLORENCE L. GOODHUE.